United States Patent [19]
Schindel

[11] Patent Number: 6,065,587
[45] Date of Patent: May 23, 2000

[54] APPARATUS FOR SINGLE FILE TRANSPORTING OF BOTTLES AND MOLDED ARTICLES

[76] Inventor: Hugo Schindel, Robert-Koch-Strasse-5, D-55291 Saulheim, Germany

[21] Appl. No.: 08/994,704

[22] Filed: Dec. 19, 1997

[30] Foreign Application Priority Data

Dec. 20, 1996 [DE] Germany .......................... 196 53 090

[51] Int. Cl.⁷ .................................................. B65G 29/00
[52] U.S. Cl. ..................... 198/465.1; 198/392; 221/169
[58] Field of Search ............... 198/465.1, 392, 198/397; 221/169, 170, 203, 233, 265

[56] References Cited

U.S. PATENT DOCUMENTS

| | | | |
|---|---|---|---|
| 4,928,808 | 5/1990 | Marti | 221/167 X |
| 5,178,256 | 1/1993 | Anderson et al. | 198/392 X |
| 5,415,322 | 5/1995 | Sala . | |
| 5,509,524 | 4/1996 | Ohmori et al. | 198/465.1 |
| 5,549,189 | 8/1996 | Martisala | 198/392 X |

FOREIGN PATENT DOCUMENTS 1576433  7/1990  U.S.S.R. ................................ 221/169

Primary Examiner—Christopher P. Ellis
Assistant Examiner—Gene O. Crawford
Attorney, Agent, or Firm—Collard & Roe, PC

[57] ABSTRACT

Apparatus for single file transporting of bottles and molded articles from a mass of initially disposed horizontally and standing bottles and molded articles includes a receiving container made of dimensionally stable material, with the interior space of this container being open at the top and receiving a molded article in the horizontal position. Each receiving container removes an individual article from the mass of molded articles with the help of a transporting unit, and the molded articles and receiving container are together received by a processing machine.

8 Claims, 7 Drawing Sheets

APPARATUS FOR SINGLE FILE TRANSPORTING OF BOTTLES AND MOLDED ARTICLES

BACKGROUND OF THE INVENTION

1. Field of the Invention

The invention relates to an apparatus for single file transporting of bottles and molded articles, arranged in horizontal and standing positions, from a mass of such bottles and articles by means of a receiving container made of dimensionally stable material. The interior space of this container is open at the top and receives a molded article in a horizontal position.

2. The Prior Art

A device for straightening and lining up oblong bottles, cans, molded articles or the like of all kinds of shapes and sizes in standing positions, having filling opening disposed at the top, and with the subsequently transfer to a conveyor device, is known from U.S. Pat. No. 5,415,322. In this known device, which has a limiting housing with a raised edge and a slanted disk, a rotating disk is present within this housing. This revolving disk is slanted correspondingly and has a catch or driver means within its marginal zone, permitting the passage of the molded articles into drop chutes. The catch or driver means substantially consists of passage openings extending tangentially relative to the edge and having a length approximately corresponding with the length of the molded articles. The molded articles are supported by a stationary bottom arranged below the passage openings. When the disk is revolving, the molded articles come to lie in the passage openings and are transported to an upper curve point, where they are received in drop chutes. Exchangeable molded elements can be inserted into the passage openings, whereby the molded elements are bottomless and develop a function only in association with the drop chute, which is disposed underneath and runs along. The molded elements do not represent any independent transporting means. They have built-in baffles for mechanically detecting the position of the bottle, so that the bottle opening is pointing up when the bottle drops. This principle only works with dimensionally stable bottles and if the bottle neck offers adequate length for support.

Furthermore, such molded elements are always designed for only one bottle size. Also, the workability of this device requires that the catch or driver means and the molded elements are quite accurately adapted to the shape and size of the molded articles. In other words, changes have to be made on the machine for processing different types of molded articles. Consequently, the molded elements and, if need be, also the catch or driver means have to be exchanged. This requires a very high investment in a multitude of inventory of differently sized parts which is very costly. Moreover, the process efficiency is reduced because the occupancy of the recesses is made more difficult on account of the adapted form or shape and results in an efficiency of only about 70% to 80%.

Another significant drawback of the prior art is that the molded articles are subjected to mechanical stress, which can very easily lead to deformation of the molded articles. This is the case especially when handling environmentally friendly thin-walled bottles. Furthermore, another drawback is that if a bottle is damaged or deformed, it is difficult to sort or cannot be sorted at all because this molded article gets jammed into the opening. The catch or driver means basically pushes the bottles across bottom or floor elements so that sensitive surfaces of the bottles or molded articles can easily become scratched. This is particularly important in connection with environmentally friendly lightweight bottles which are already labeled. The label must not show any scratch traces, which lead to malfunction or breakdown of the machine. Moreover, the material expenditure is significantly high on account of the fact that sized parts have to be kept available in storage for changes when molded articles of different dimensions have to be processed.

SUMMARY OF THE INVENTION

It is an object of the present invention to provide an apparatus by which bottles and molded articles of different dimensions and shapes can be aligned single file and transported without costly and high expenditure in terms of sized-part requirements.

The above object is achieved according to the present invention which provides an apparatus for single file transporting of bottles and molded articles which are initially arranged in a horizontal and vertical mass of such bottles and articles comprising a receiving container made of dimensionally stable material, the container having an interior space which is open at the top for receiving a molded article in a horizontal position; and transporting means for driving the receiving container from an initial mass of articles and means for admitting the container into a processing machine.

In particular, the invention offers the advantage that a great number of bottle shapes and molded articles can be aligned single file and transported in such a receiving container. The interior of the receiving container may be significantly larger than the bottle or molded article to be conveyed so that the receiving container can easily accommodate the bottle or article. Furthermore, a significantly high degree of efficiency can be achieved in this manner. Therefore, the apparatus can be operated at a lower rate of speed, and thus with a higher degree of safety on account of the high occupancy possibility. Since the receiving container is not a component of the sorting system, bottles or molded articles can be admitted to individual work processes operating in linear or rotating ways. Another advantage is that defects on the bottles or molded articles caused by squeezing or shearing are avoided. With the invention, the bottles or molded articles are not pushed across a stationary surface so that surfaces sensitive to scratching can be processed without scratching.

Furthermore, it is advantageous that the receiving containers can be modified in a simple way to accommodate bottles and molded articles having different dimensions.

A further advantage is that transportation to a machine downstream for further processing may take place over any desired distance at any level, which facilitates adaptation to the space conditions at the installation site.

Moreover, any desired control or treatment stations may be installed for sorting out bottles or molded articles that are damaged or deformed in some other way. Such quality control to distinguish between poor quality or good quality bottles is not possible with the known devices.

BRIEF DESCRIPTION OF THE DRAWINGS

Other objects and features of the present invention will become apparent from the following detailed description considered in connection with the accompanying drawing which discloses embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
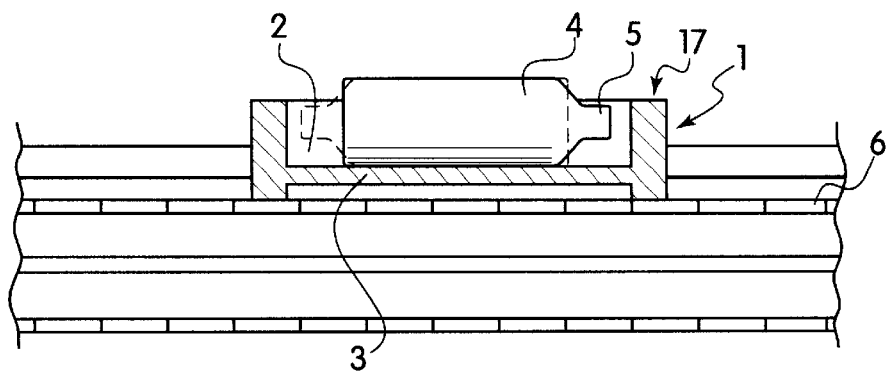
FIG. 1 shows a longitudinal section view through an embodiment of the receiving container.
Figure 2:
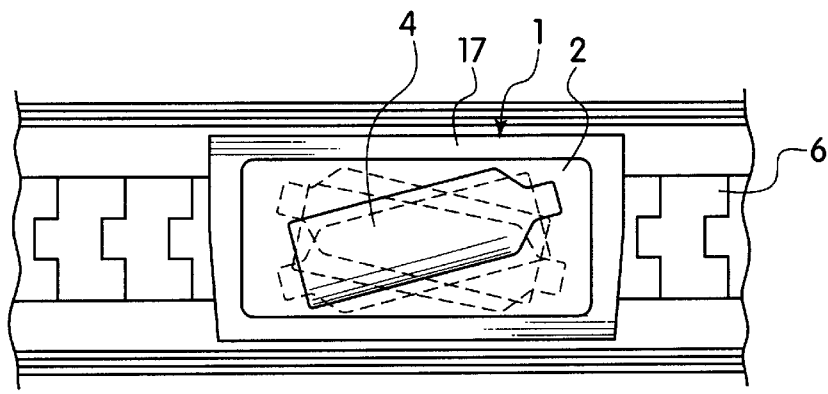
FIG. 2 is a top view of FIG. 1.

Turning now in detail to the drawings, the receiving container 1 is shown in FIGS. 1 and 2 and has an approximately rectangular shape. Container 1 has an interior space 2 which is open at the top, and has a bottom 3, whereby a molded article 4 can be loosely arranged in this interior space 2. Container 1 may be externally rounded on the corners or may have an oval external shape. The interior space is rectangular with rounded corners. Interior space 2 is designed in such a way that the molded article 4 is loosely contained therein. The size of molded article 4 can be varied within a range such that no second molded article 4 can be jointly transported by such a receiving container 1.

Receiving container 1 is made from a dimensionally stable material, for example a suitable plastic, whereby bottom 3 is preferably transparent. Bottom 3 may be vertically adjustable, if need be. The molded articles or bottles 4 are transported in a horizontal position in interior space 2. It is unimportant for such transport whether bottle opening 5 extends in the direction of transport or extends opposite to the direction of transport. Bottle 4 may also reside in a slanted position relative to the transport direction. The transport takes place with the help of suitable transporting means such as, for example, conveyor belts 6 or also slide rails. On this transporting means, the lined-up receiving containers 1 are advanced with the help of driving gears or lateral belts, toothed belts or chains. Such a conveyor belt 6 may be guided by being adapted to the space conditions in any desired way.

Figure 3:
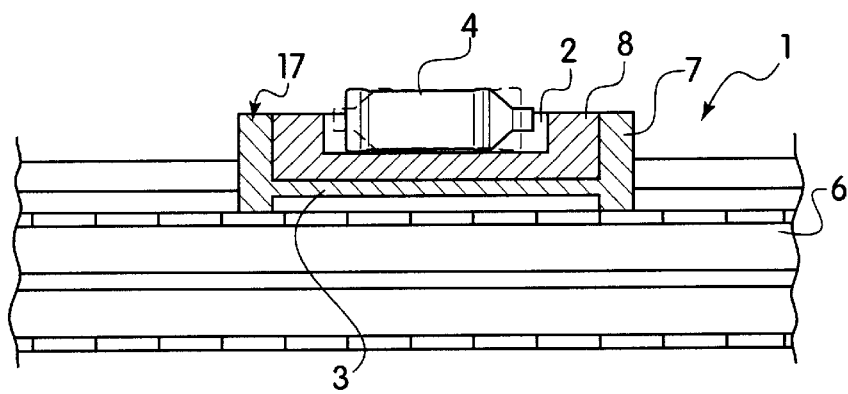
FIG. 3 shows a longitudinal section view through another embodiment of the receiving container.
Figure 4:
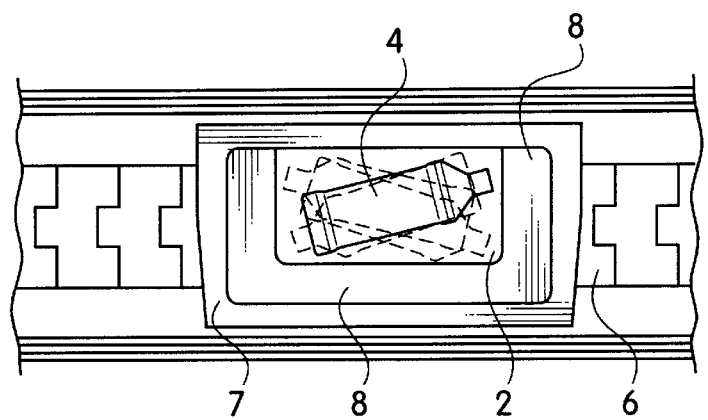
FIG. 4 is a top view of FIG. 3.

According to the embodiment shown in FIGS. 3 and 4, receiving container 1 comprises a basic container 7 having an interior space corresponding with the largest molded article. However, if smaller articles 4 are to be transported, then space reducing insert pieces 8 may be used for reducing the interior space.

Figure 5:
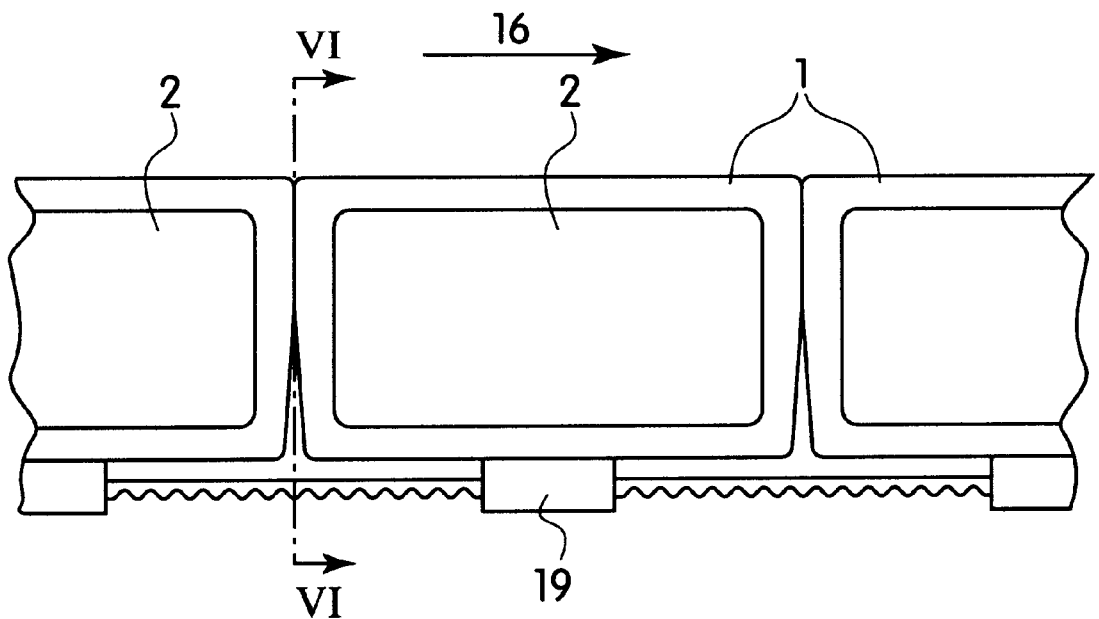
FIG. 5 is a top view of a number of receiving containers lined up in a row, adjacent to a toothed belt drive.
Figure 6:
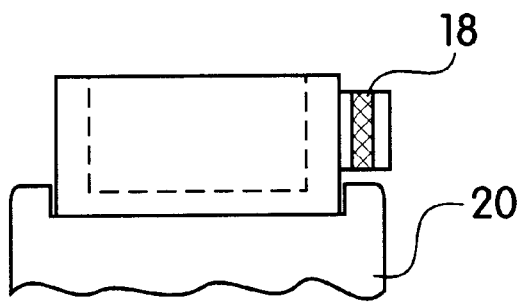
FIG. 6 shows a section view along line 6—6 in FIG. 5.

With the embodiment shown in FIGS. 5 and 6, the individual receiving containers 1 are transported with the help of a toothed belt 18, on which the containers can be fastened by means of a clamping device 19. Containers 1 move on a slide rail 20 which is designed for low-noise or quiet operation. The toothed-belt drive ensures transporting of receiving containers 1 with precise movement of each unit.

Figure 7:
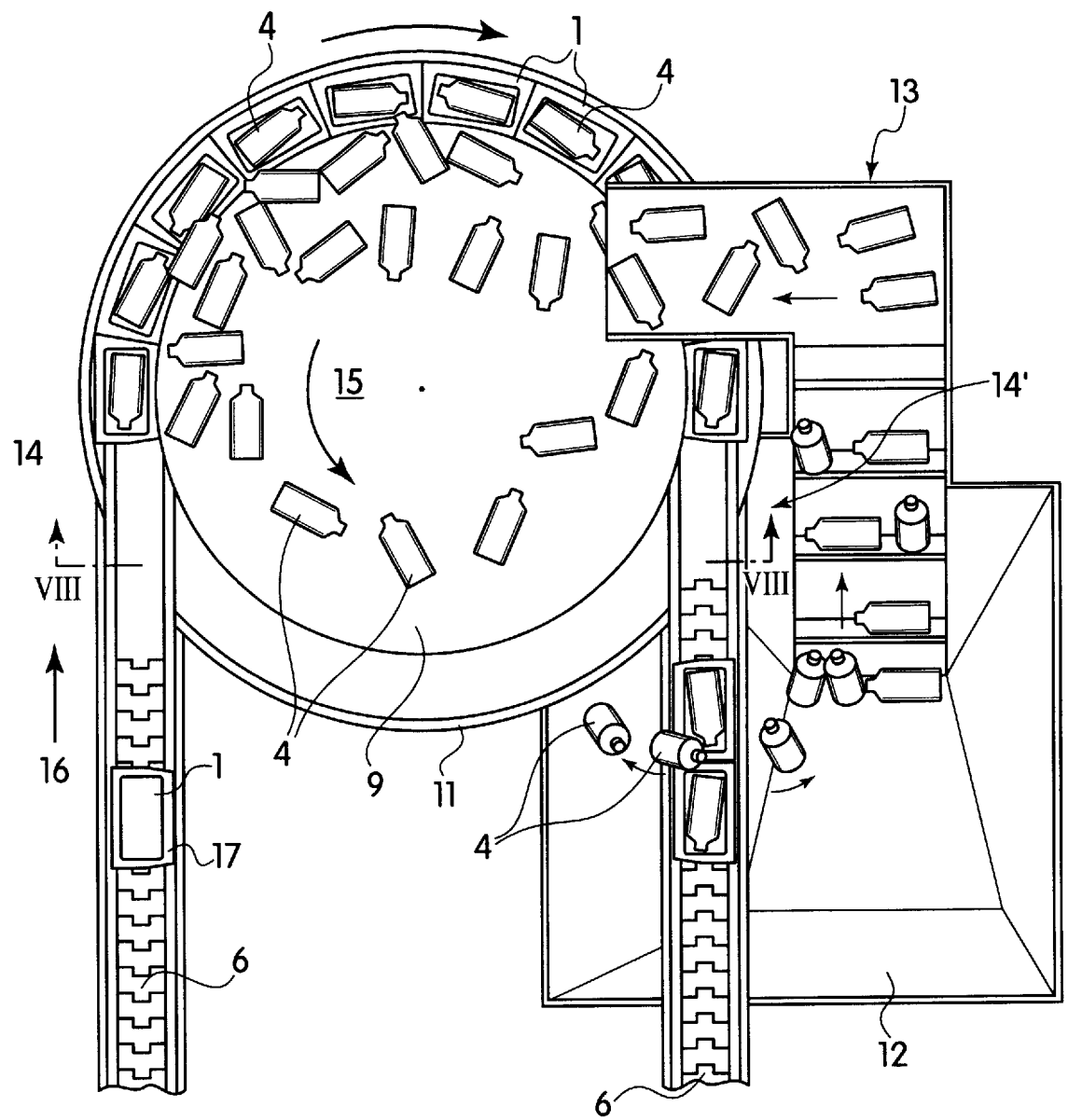
FIG. 7 is a top view of an apparatus for single file transporting of bottles or molded articles, employing such a receiving container.
Figure 8:
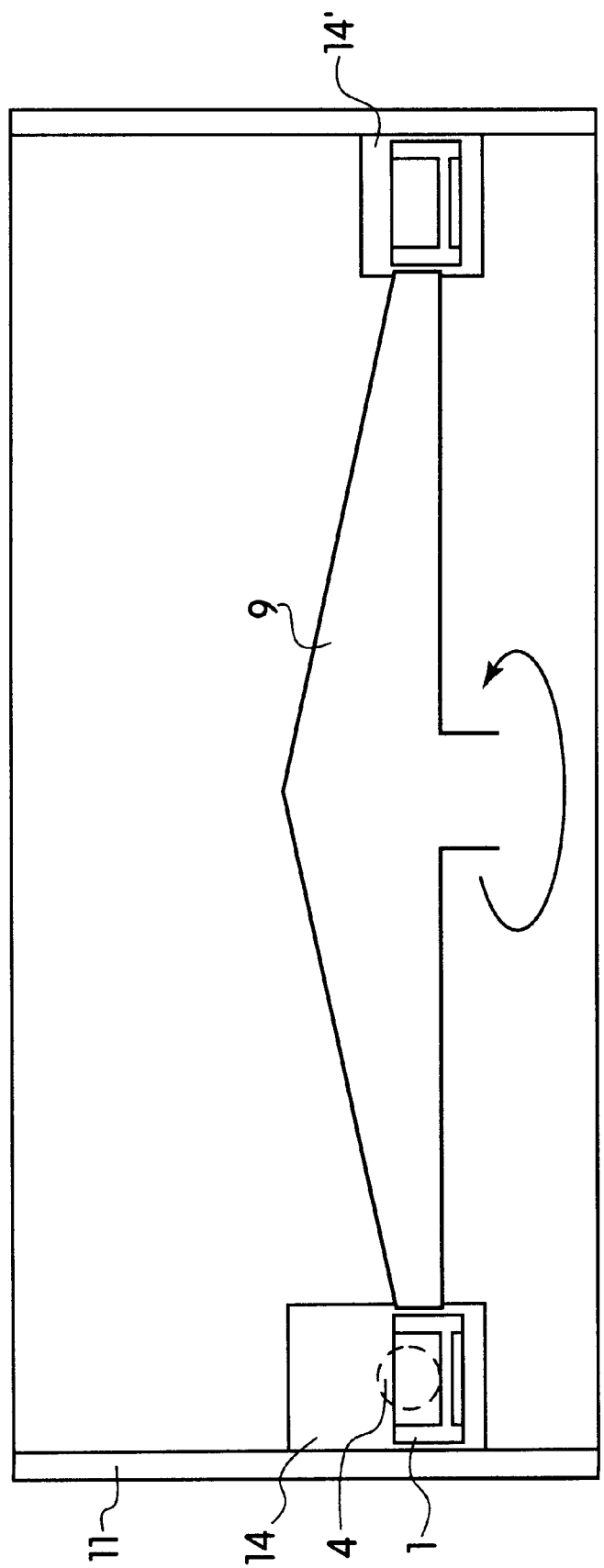
FIG. 8 shows a section view according to line 8—8 in FIG. 7.

FIGS. 7 and 8 show an embodiment for loading the receiving containers 1 with bottles or molded articles 4. Here, conveyor belt 6 feeds onto a distributor disk 9, which is at the same level as belt 6, as is also the top edge of receiving container 1. Disk 9 is a processing machine. A raised edge 11 is mounted around the distributor disk 9 so that molded articles 4 are retained within the scope of distributor disk 9. A feeding device 13 has a filling hopper 12, and this device 13 may be mounted laterally. Device 13 serves for loading the molded articles 4 into the edge 11 of the disk 9. Edge 11 on distributor disk 9 is interrupted and provided with passages 14 and 14' in those locations where conveyor belts 6 are tangentially guided to and from the edge of distributor disk 9. Passage 14 is a means for admitting the container 1 into the processing machine or disk 9.

Distributor disk 9 can be designed in different ways. For example, it may be a flat, horizontally arranged revolving disk with the direction of rotation 15 being opposite to the forward direction 16 of conveyor belt 6. An additional disk 9 may be designed with a slightly conical shape so that molded articles 4 are received on the edge on account of the bevel of the cone shape. The level of disk 9 within its marginal zone is basically disposed at the level of top edge 17 of receiving container 1. However, disk 9 may also be designed as a non-rotating disk, in which case a suitably conical shape is required for disk 9. In this embodiment, the molded articles 4 can slide to the edge of non-rotating disk 9 and thus can be received within the interior space of receiving container 1. In the present case, transporting conveyor means 6 has to be extended along the edge up to the exit, following the circular configuration of disk 9.

Directly following exit opening 14' of transporting conveyor means 6 is an ejector means. Thus, molded articles 4 not properly deposited in container 1 are removed with the help of this ejector means, for example a known pneumatic blowing device. The articles 4 are again received in hopper 12 of feeding device 13.

Figure 9:
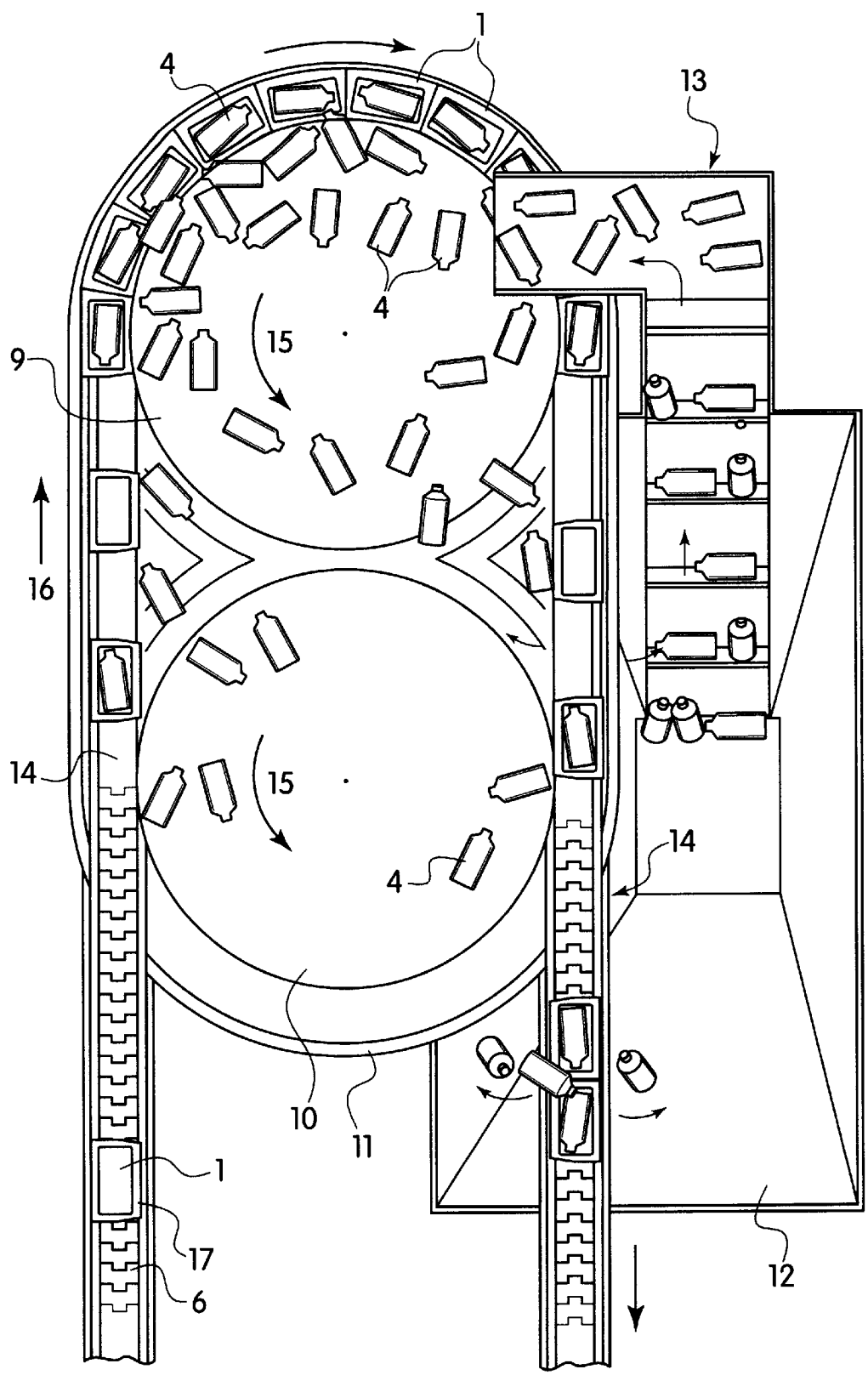
FIG. 9 shows a top view of another embodiment of a single file transporting apparatus.

FIG. 9 shows another embodiment wherein there are a plurality of distributor disks 9 and 10 which, if designed to rotate, can revolve in the same direction. This improves the capacity and efficiency of the apparatus. Such distributor disks 9 and 10 also may be non-rotating disks provided with a conical shape. Thus, disks 9 and 10 are an example of a processing machine.

Figure 10:
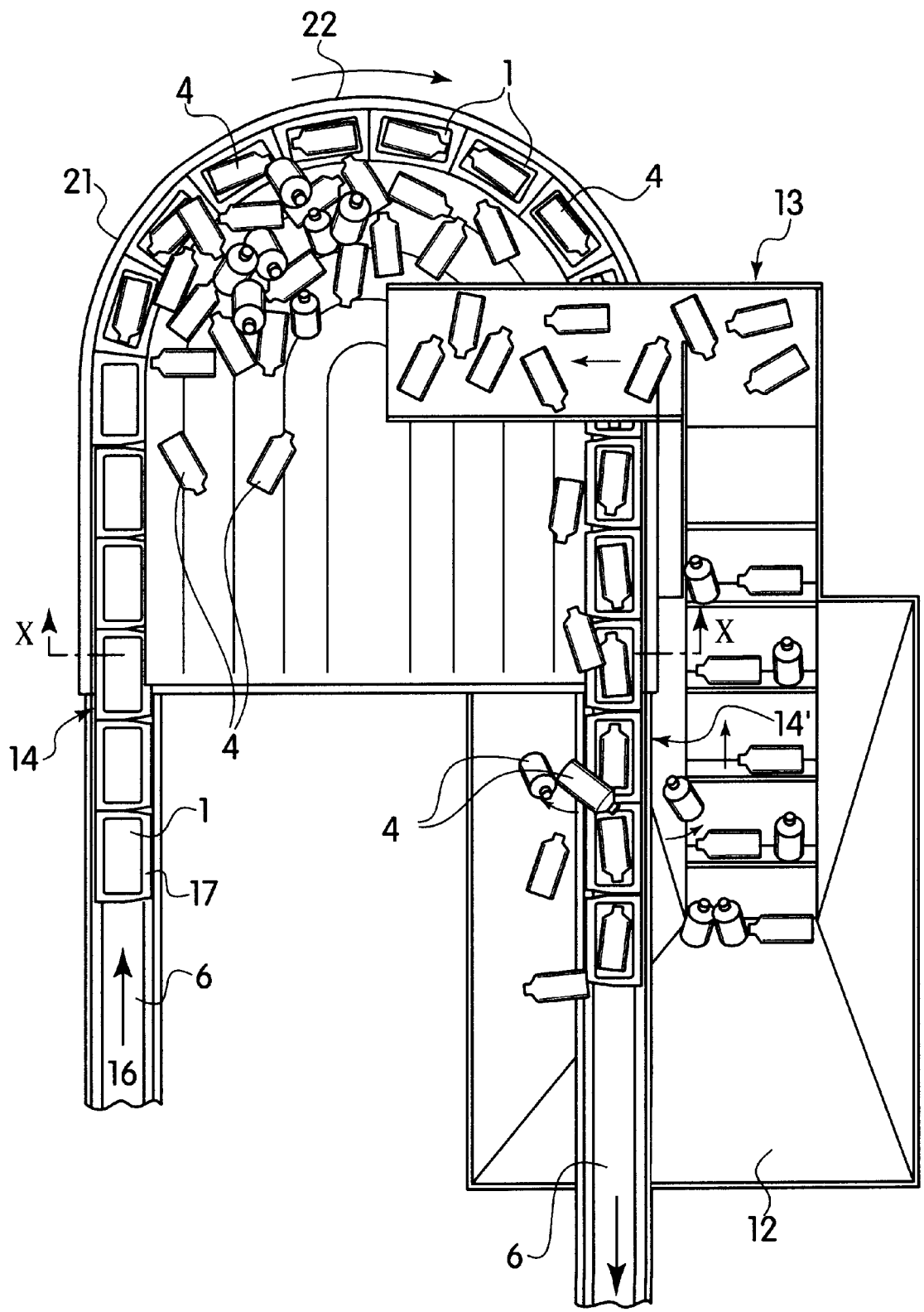
FIG. 10 shows a top view of yet another embodiment of a single file transporting apparatus.
Figure 11:
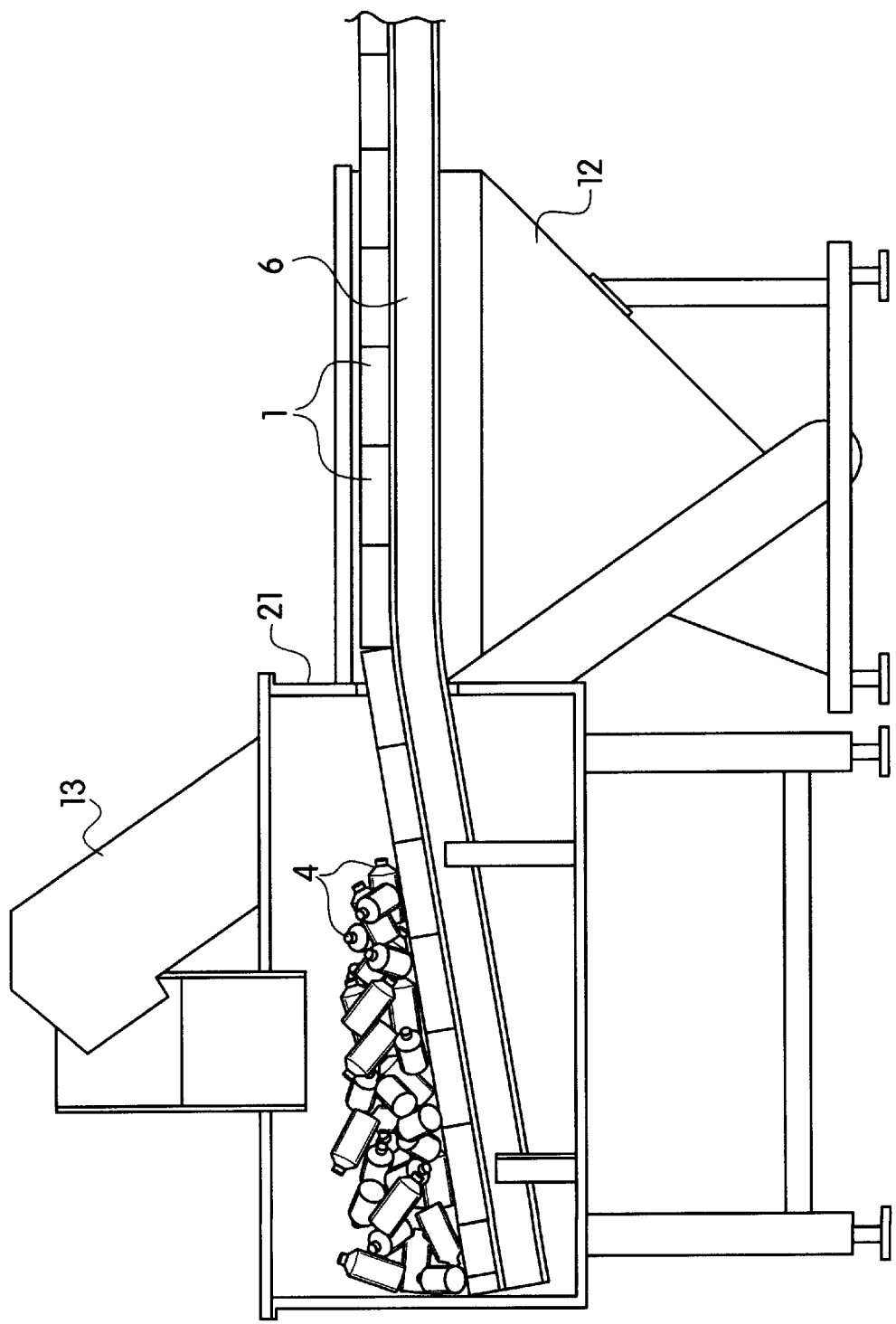
FIG. 11 shows a section view along line 10—10 in FIG. 10.

In the embodiment shown in FIGS. 10 and 11, the individual molded articles or bottles 4 are loosely dumped into a hopper or container 21. The transporting means, e.g. conveyor belt 6, is passed through this hopper 21 by way of passages 14 and 14'. In this way, the individual receiving containers 1 are passed through the hopper 21 as well and are loaded with the molded articles or bottles 4. Back wall 22 of hopper 21 is designed with a semicircular shape. This provides for a smooth return of transporting means 6. This design is particularly suitable for low-cost implementation of the system. Hopper 21 is an example of a processing machine.

While several embodiments of the present invention have been shown and described, it is to be understood that many changes and modifications may be made thereunto without departing from the spirit and scope of the invention as defined in the appended claims.

What is claimed is:

1. An apparatus for single file transporting to a processing machine of articles comprising
   (a) a collecting container containing an initial mass of articles which are initially arranged in an unorganized mass, said collecting container comprising at least one distributor disk for receiving the articles forming the initial mass of articles;
   (b) at least one receiving container made of dimensionally stable material, said container having a bottom and an interior space which is open at the top for receiving and transporting in a lying position a single article from the initial mass of articles; and
   (c) conveying means for guiding the at least one receiving container through the collecting container and for transporting the at least one receiving container with the received article therein to the processing machine in the lying position, said conveying means comprising linear conveyor belts for guiding the receiving containers along the at least one distributor disk.

2. Apparatus according to claim 1, wherein the receiving container has a rectangular trough depression as the interior space.

3. Apparatus according to claim 1, wherein the receiving container has a basic container corresponding with a largest molded article, and has reducing pieces being insertable into said basic container for reducing the interior space.

4. Apparatus according to claim 1, wherein the conveying means comprises a conveyor belt having slide rails with a toothed-belt drive.

5. Apparatus according to claim 1, further comprising means for loosely dumping the articles forming the initial mass of articles into the collecting container.

6. Apparatus according to claim 1, wherein the bottom of the receiving container is transparent.

7. Apparatus according to claim 6, comprising means for making the bottom of the receiving container vertically adjustable.

8. Device according to claim 7, wherein said adjustable means is an insert.

* * * * *